Figure 1:
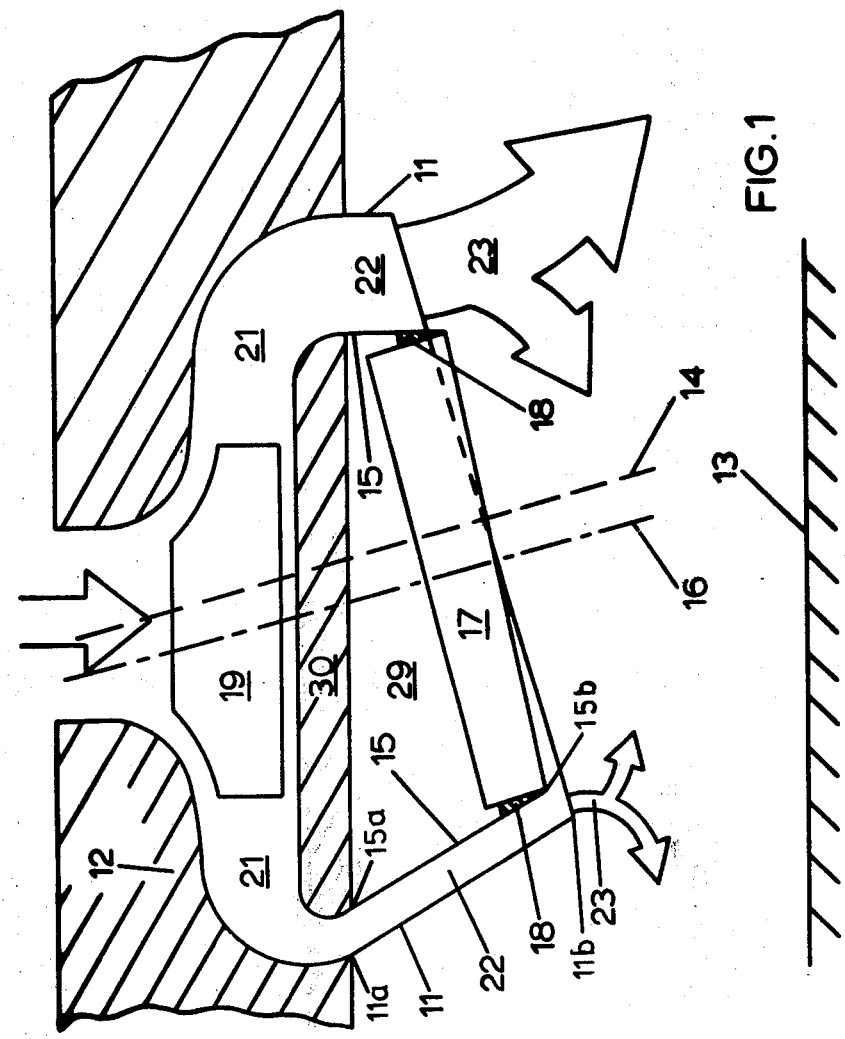

United States Patent [19]

Crewe

[11] 3,968,852
[45] July 13, 1976

[54] STABILIZING MEANS FOR AIR CUSHION VEHICLES

[75] Inventor: Peter Rowland Crewe, Newport, England

[73] Assignee: British Hovercraft Corporation Limited, England

[22] Filed: Aug. 5, 1974

[21] Appl. No.: 495,054

[30] Foreign Application Priority Data
Aug. 15, 1973 United Kingdom............... 39592/73

[52] U.S. Cl................................. 180/118; 114/67 A
[51] Int. Cl.² .......................................... B60V 1/11
[58] Field of Search....................... 114/67 A, 67 R; 180/116–118, 127, 128

[56] References Cited
UNITED STATES PATENTS

| | | | |
|---|---|---|---|
| 3,189,114 | 6/1965 | Eggington | 114/67 A |
| 3,297,102 | 1/1967 | Cockerell | 180/118 |
| 3,443,659 | 5/1969 | Moore et al. | 180/118 |
| 3,575,116 | 4/1971 | Hart et al. | 180/118 |
| 3,631,938 | 1/1972 | Eggington | 180/118 |
| 3,724,588 | 4/1973 | Bertin et al. | 180/118 |
| 3,804,197 | 4/1974 | Grignon | 180/127 |

*Primary Examiner*—Trygve M. Blix
*Assistant Examiner*—Stuart M. Goldstein
*Attorney, Agent, or Firm*—Larson, Taylor and Hinds

[57] ABSTRACT

An air cushion vehicle is provided with at least one stabilizing device comprising first and second members formed from endless bands of flexible impermeable material attached at first edges to the underside of the vehicle so as to extend downwardly therefrom and terminate at second edges. The first member surrounds the second member and is spaced therefrom so that in operation pressurized air from a source on the vehicle passes downwardly between the members to flow from between the second edges in the form of an air curtain which builds up and maintains a localized cushion of pressurized air within the stabilizing device.

7 Claims, 6 Drawing Figures

STABILIZING MEANS FOR AIR CUSHION VEHICLES

This invention relates to air cushion vehicles, and is particularly concerned with stabilizing means for such vehicles.

Stability in pitch and roll is desirable in an air cushion supported vehicle in order to prevent excessive water contact resulting from random changes in moment. Such contact can produce unwanted hydrodynamic forces and moments on the vehicle which in some cases can be dangerous. Although an air cushion vehicle without any form of skirt is statically unstable unless the cushion is sub-divided, it is possible to achieve some static stability simply by the addition of a flexible skirt. While the degree of stiffness obtainable in this way is limited it is considered adequate with some types of skirt.

Air cushion vehicles having what are known in the art as bag and finger skirts employ compartmentation of the cushion for additional stability. This compartmentation normally takes the form of flexible lateral stability barriers and a flexible longitudinal keel which may extend for the whole or a part of the lenght of the vehicle. The compartmentation of the cushion area in this way has the disadvantage that long lengths of flexible material are required for the compartmentation barriers, which adds considerably to the weight of appendages beneath the vehicle. A further disadvantage is that the contact of these barriers with the surface over which the vehicle is operating increases the drag of the vehicle.

Air cushion vehicles having what are known in the art as open loop and finger skirts do not employ compartmentation of the cushion, instead they rely on shifting the center of pressure of the cushion to obtain stability in pitch and roll. This requires a complicated system for movement of the flexible skirt, which system includes hydraulic or pneumatic actuators, mechanical linkages and electrical devices. Such a system has the disadvantage that as well as being expensive, it is liable to failure and requires a high degree of maintenance.

It is an object of the present invention to provide stabilizing means for an air cushion which avoid or reduce some of the disadvantages of the aforementioned systems.

The stability characteristics can have a considerable influence on the response of the vehicle to its controls. For example, a problem arises on a vehicle which obtains directional control from a swivelling propulsion propeller mounted aft in that movement of the propeller for directional control purposes casues the craft to roll outwards in a turn. This results in immersion of the skirt on that side of the vehicle, and produces a hydrodynamic yawing force sufficient to offset the applied control force. Furthermore, if the pitch stiffness is too low it is possible for the rear skirt to scoop water, which again can make turning difficult, while a nose-down movement is potentially dangerous in that it can initiate a plough-in.

It is another object of the invention to provide stabilizing means which improve the pitch and roll characteristics of an air cushion vehicle to substantially overcome these problems.

Accordingly this invention provides in a vehicle which in operation receives support from a cushion of pressurised air provided in an area between the underside of the vehicle and a surface over which it operates, stabilizing means arranged for maintaining beneath the vehicle at least one localized cushion of air at a pressure which is higher than the air in the vehicle supporting cushion, the arrangement being such that in operation, when the height of the vehicle above the surface over which it is operating decreases, there is an increase in the pressure of the localised cushion of air which acts between the underside of the vehicle and the surface over which it is operating to produce stabilizing forces on the vehicle. Preferably stabilizing means are provided for maintaining two localized cushions of high pressure air beneath the vehicle, the localized cushions being positioned one on either side of the longitudinal axis of the vehicle and in the forward half of the cushion area. If desired, these localized cushions of air may be positioned so as to form a part of a flexible skirt assembly which extends around the bow and along at least part of the longitudinal sides of the vehicle.

In one form of the invention stabilizing means for maintaining beneath an air cushion supported vehicle a localized cushion of air at a pressure which is higher than that of the air in the vehicle supporting cushion includes a first member comprising an endless band of flexible impermeable material tapering downwardly and inwardly from a first edge attached to rigid structure at the underside of the vehicle to terminate at a second edge and arranged so that it surrounds and is spaced from a second member comprising an endless band of flexible impermeable material tapering downwardly and inwardly from a first edge attached to rigid structure at the underside of the vehicle to terminate at a second edge, means on the vehicle for producing a flow of pressurized air which in operation passes downwardly between the first and second members to flow from between the second edges thereof in the form of an air curtain, part of the air curtain serving to build up and maintain a cushion of pressurized air within a space defined by the underside of the vehicle and the second member.

Various embodiments of the invention will now be described, by way of example only, with reference to the accompanying drawings, in which:-

Figure 2:
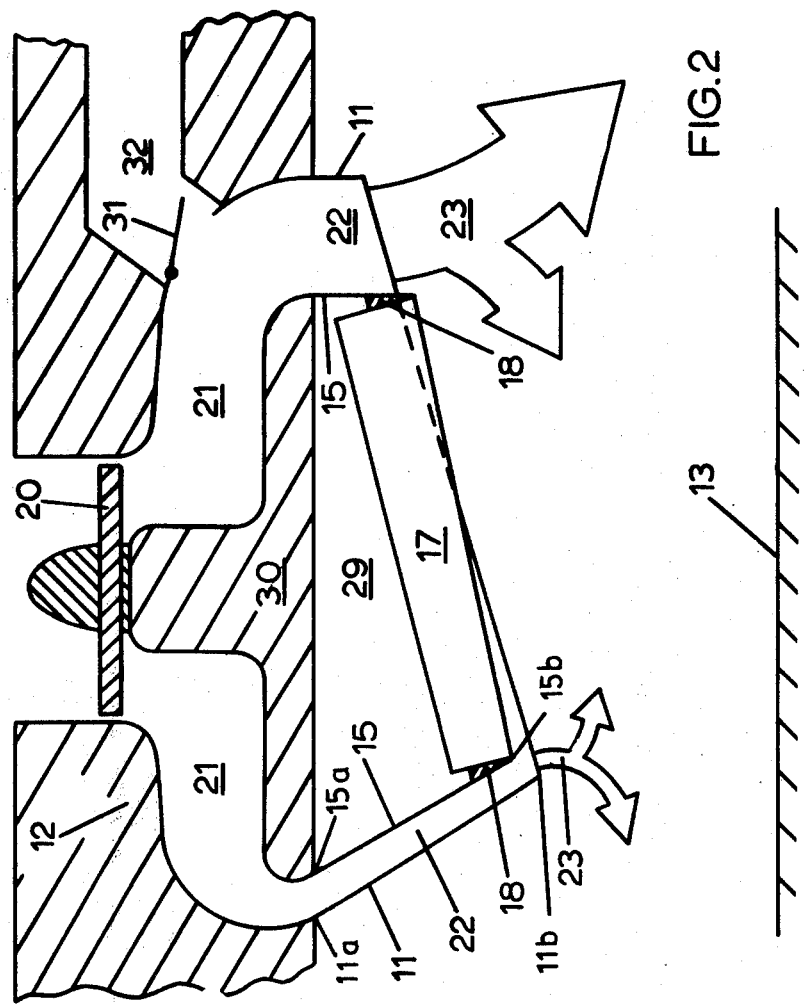

FIG. 1 is a schematic section of stabilizing means according to a first embodiment of the invention, FIG. 2 is a schematic section of stabilizing means according to a second embodiment of the invention, and FIG. 3 to 6 are schematic side elevations and inverted half plans of air cushion supported vehicles having stabilizing means according to the invention.

Referring first to FIG. 1, one form of stabilizing means in accordance with the invention includes a first member 11 comprising an endless band of flexible impermeable material tapering downwardly and inwardly from a first edge 11a attached to rigid structure at the underside of the vehicle 12 to terminate at a second edge 11b. The first member 11 surrounds a second member 15 comprising an endless band of flexible impermeable material tapering downwardly and inwardly from a first edge 15a attached to rigid structure of the vehicle 12 to terminate at a second edge 15b. A space 22 is formed between the first and second members 11 and 15 respectively.

The shapes defined by the first and second members 11 and 15 when viewed in plan may be of any predetermined configuration. The first FIG. 11 is symmetrical about an axis represented by the dashed line 14 and the second member 15 is symmetrical about an axis represented by the chain line 16.

The axes represented by the dashed line 14 and the chain line 16 are offset from each other and are inclined to the vertical so that the first and second members 11 and 15 are tilted in relation to a surface 13 above which the vehicle is supported. The first member 11 and the second member 15 are retained in positional relationship with each other and with the rigid structure of the vehicle 12 by flexible tension means (not shown). An inwardly directed lip 17 which conforms to the shape of the second member 15 is provided at the second edge 15b to reduce the possibility of water being scooped up by the second member 15. The lip 17 is reinforced with a flexible bead 18.

Figure 4:
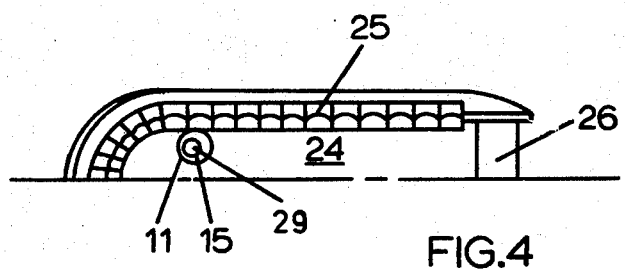
Figure 6:
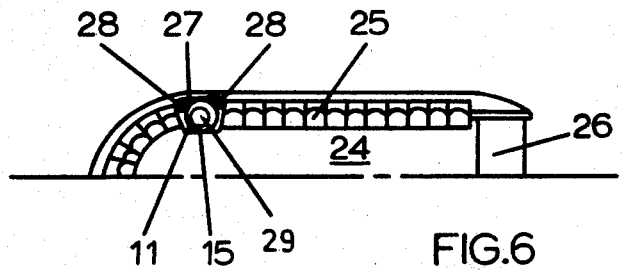

In operation of the vehicle 12 a flow of pressurized air is supplied by a centrifugal fan 19. The pressurized air flows by way of a duct 21 in the structure of the vehicle 12 to the space 22 between the first and second members 11 and 15. The pressurized air passes downwardly between the first and second members to flow from between their second edges 11b and 15b respectively, in the form of an air curtain represented by the arrows 23. Some of this air passes into a space 29 defined by a part 30 of the underside of the vehicle 12 and the second member 15 to form a localized cushion of air which is at a higher pressure than the air in the vehicle supporting cushion 24 (FIGS. 4 and 6). By tilting the axes 14 and 16 of the first and second members 11 and 15 respectively, and by making the distance between the first and second edges of each of the first and second members decrease from a maximum dimension at those parts which are positioned forward with respect to the vehicle to a minimum dimension at those parts which are positioned rearwardly with respect to the vehicle, scooping of water by the first and second members is greatly reduced. The axis 16 of the second member 15 is offset forward of the axis 14 of the first member 11 with respect to the vehicle, thus creating a wider spacing 22 towards the rear of the vehicle. Thus a larger air curtain is provided in this area which helps to prevent loss of air from the space 29 due to the smaller length dimension in this area of the first and second members 11 and 15.

FIG. 2 illustrates a similar stabilizing means to that illustrated in FIG. 1 in which the flow of pressurized air is provided by an axial fan 20. Also in FIG. 2 a duct 32 is shown leading off the duct 21 and being closed with respect to the duct 21 by a spring-loaded relief valve 31. The purpose of this duct 32 and valve 31 will be further described later in this specification.

Figure 3:
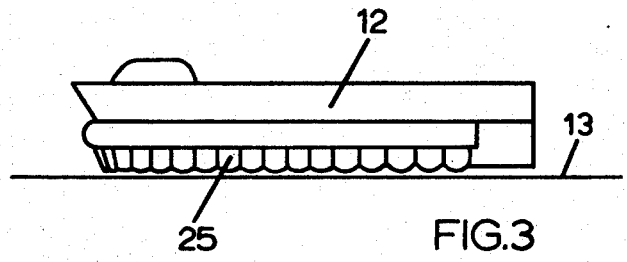

Referring now to FIGS. 3 and 4, a vehicle 12 receives support from a cushion of pressurized air provided in an area 24 between the underside of the vehicle and a surface 13 over which it operates.

The cushion area 24 is bounded by flexible skirts 25 attached to the bow portion and along the longitudinal sides of the vehicle and a flexible stern barrier 26 attached across the rear of the vehicle. Stabilizing means are situated within the cushion area 24 so as to define two localized cushions of high pressure air in spaces 29, only one being shown in FIG. 4. These localized cushions of pressurized air are located one on either side of the longitudinal centreline of the vehicle and in the forward half of the cushion area 24.

Figure 5:
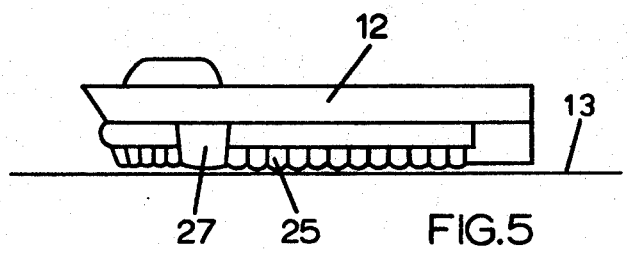

FIGS. 5 and 6 show a similar vehicle 12 to that shown in FIGS. 3 and 4 but in this case the localized air cushions formed by the two stabilizing means are situated in the line of the cushion boundary formed by the flexible skirts 25. In this arrangement a sheet of flexible material 27 passes around the first member 11 and around vertical pressurized flexible cylinders 28 to provide an efficient cushion seal with the adjacent parts of the flexible skirt 25.

In the stabilizing means according to the invention some of the air diffusing from the air curtains 23 supplements the main lift fans (not shown) in supplying pressurized air to the air cushion area 24. The fans 19 or 20 are designed so as to raise the pressure of ambient air to a pressure sufficient to provide effective air curtains within the pressurized air cushion area 24.

When the air cushion supported vehicle 12 departs from a level attitude in either roll, pitch or heave, the distance between the underside of the vehicle and the surface 13 is reduced. When this distance is reduced the air curtain 23 becomes more effective and the pressure in the space 29 increases. The increased pressure is effective on the part 30 of the rigid structure of the vehicle and produces a righting force. The part 30 is connected to the main structure of the vehicle 12 by suitable structural means, not shown in FIGS. 1 and 2.

Should the distance between the underside of the vehicle and the surface reduce to such an extent that the air curtain is restricted and the pressure increases in the space 22 and in the duct 21 so that the fan would be liable to stall, the spring-loaded relief valve 31, shown diagrammatically in FIG. 2 only, opens to relieve the pressure. The surplus air is conveyed by way of the duct 32 to either the air cushion 24 or to the ambient air.

The effectiveness of the stabilizing means and hence the type of ride produced, is dependent upon the distance between the lowest part of the first and second members and the surface above which the vehicle is operating. There is, therefore, an optimum relationship between the vertical distance measured from the underside of the rigid body of the air cushion vehicle to the lowest tip of the first and second members and the vertical distance measured from the underside of the rigid body of the air cushion vehicle to the lowest tip of the cushion barrier. Further, there is a range for this relationship within which the stabilizing means operates effeciently and allows the ride characteristics to vary between "hard" and "soft." In our experience the vertical distance measured from the underside of the rigid body of the air cushion vehicle to the lowest tip of the first and second members should be within the range of 25% to 75% of the vertical distance measured from the underside of the rigid body of the air cushion vehicle to the lowest tip of the cushion barrier.

Although various embodiments of the invention have been described with reference to the accompanying drawings, it will be appreciated that the invention is not limited thereto. For example, in a non-illustrated modification of the vehicle shown in FIGS. 3 and 4, and of the vehicle shown in FIGS. 5 and 6, stabilising means are provided for maintaining a third localized cushion of pressurized air, in accordance with the invention, positioned on the longitudinal centerline of the vehicle in the rear half of the cushion area.

Furthermore, the invention is not limited to use on amphibious air cushion vehicles, it is also applicable to sidewall air cushion vehicles and to so-called surface effect ships.

I claim as my invention:

1. An air-cushion vehicle including means for providing a supporting air cushion, cushion barrier means for sealing said air cushion and at least one stablizing device comprising first and second members formed from endless bands of flexible impermeable material having first edges attached to structure at the underside of the vehicle and extending downwardly therefrom to terminate at second edges, said first member extending around and being spaced from said second member, means on the vehicle for producing a flow of pressurized air which in operation of the vehicle passes downwardly between said first and second members to flow from between the second edges thereof in the form of an air curtain which serves to build up and maintain a localized cushion of pressurized air at a pressure which is higher than that of the air in the vehicle supporting cushion within a space defined by said cushion barrier means, the underside of said vehicle, and a surface over which said vehicle is supported, so that in operation when the height of said vehicle above the surface over which it is operating decreases there is an increase in the pressure of said localized cushion of air which acts between the underside of said vehicle and said surface to produce a stabilizing force on the vehicle, the vertical distance measured from said structure at the underside of said vehicle to the second edges of said first and second members being between 25% to 75% of the vertical distance measured from the underside of said vehicle to the lowermost point of said cushion barrier means during the normal operation of the vehicle.

2. A vehicle as claimed in claim 1, wherein the vehicle includes two of said stabilizing devices positioned one on either side of the longitudinal axis of the vehicle and in the forward half of the supporting air cushion area.

3. A vehicle as claimed in claim 2, wherein said stabilizing devices are positioned so as to form a part of a flexible skirt assembly which extends around the bow and along at least part of the longitudinal sides of the vehicle.

4. A vehicle as claimed in any one of claim 1, wherein said means for producing a flow of pressurized air comprises a centrifugal fan.

5. A vehicle as claimed in any one of claim 1, wherein said means for producing a flow of pressurized air comprises an axial fan.

6. A vehicle as claimed in claim 1 wherein those parts of the stablizing device that are forward with respect to the vehicle, extend beneath the vehicle so as to be of larger dimension in length than those parts of the stablizing device that are aft with respect to the vehicle.

7. A vehicle as claimed in claim 6 wherein the axis of the second member is offset from the axis of the first member so as to be disposed forward with respect to the vehicle.

* * * * *